(12) United States Patent
Ito (10) Patent No.: US 12,466,368 B2
(45) Date of Patent: Nov. 11, 2025

(54) VEHICLE STOP HOLDING DEVICE

(71) Applicant: TOYOTA JIDOSHA KABUSHIKI KAISHA, Toyota (JP)

(72) Inventor: Yuma Ito, Obu (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 99 days.

(21) Appl. No.: 18/489,476

(22) Filed: Oct. 18, 2023

(65) Prior Publication Data

US 2024/0239315 A1 Jul. 18, 2024

(30) Foreign Application Priority Data

Jan. 13, 2023 (JP) ................. 2023-003879

(51) Int. Cl.
*B60T 8/17* (2006.01)
*B60T 8/88* (2006.01)

(52) U.S. Cl.
CPC ............... *B60T 8/17* (2013.01); *B60T 8/885* (2013.01); *B60T 2220/00* (2013.01); *B60T 2220/04* (2013.01); *B60T 2220/06* (2013.01)

(58) Field of Classification Search
CPC ........ B60T 8/17; B60T 8/885; B60T 2220/00; B60T 2220/04; B60T 2220/06
See application file for complete search history.

(56) References Cited

U.S. PATENT DOCUMENTS

| | | |
|---|---|---|
| 8,355,851 B2 | 1/2013 | Inoue et al. |
| 8,370,040 B2 | 2/2013 | Inoue et al. |
| 8,417,430 B2 | 4/2013 | Saeki |
| 8,548,709 B2 | 10/2013 | Morita |
| 8,768,597 B2 | 7/2014 | Kagawa |
| 9,174,643 B2 | 11/2015 | Aso |
| 10,017,178 B2 | 7/2018 | Morimoto et al. |
| 10,118,617 B2 | 11/2018 | Urano et al. |

(Continued)

FOREIGN PATENT DOCUMENTS

| | | | | |
|---|---|---|---|---|
| CN | 101511652 B | * | 8/2011 | ............. B60T 1/005 |
| JP | 2006-306350 A | | 11/2006 | |

(Continued)

OTHER PUBLICATIONS

Machine Translation of JP 2015016803 A PDF File Name: "JP2015016803A_Machine_Translation.pdf" (Year: 2015).*

(Continued)

*Primary Examiner* — Hung Q Nguyen
*Assistant Examiner* — Ruben Picon-Feliciano
(74) *Attorney, Agent, or Firm* — SoraIP, Inc.

(57) ABSTRACT

A vehicle stop holding device for holding a stop of a vehicle includes a ECU for starting execution of a backup control for holding a stop state of the vehicle by a brake holding device when an operation of getting off the driver of the vehicle is detected while the vehicle is stopped by the brake device, and ECU outputs a brake operation request for requesting an operation of the brake device to the driver and releases the brake of the brake device when both a release operation of the seat belt by the driver of the vehicle and an opening operation which is an operation for opening the door are detected during a period from the start of the execution of the backup control until the completion of the completion.

9 Claims, 5 Drawing Sheets

(56) References Cited

U.S. PATENT DOCUMENTS

| | | |
|---|---|---|
| 10,486,698 B2 | 11/2019 | Masui et al. |
| 2019/0295419 A1 | 9/2019 | Tosa et al. |
| 2021/0039613 A1* | 2/2021 | Kakeshita ....... B60W 30/18027 |
| 2021/0394773 A1* | 12/2021 | Tanaka .................. B60W 50/12 |

FOREIGN PATENT DOCUMENTS

| | | | | |
|---|---|---|---|---|
| JP | 2008230424 A | * | 10/2008 | ................ B60T 1/10 |
| JP | 2009261180 A | * | 11/2009 | |
| JP | 2011-207405 A | | 10/2011 | |
| JP | 2015016803 A | * | 1/2015 | ............... B60C 9/00 |

OTHER PUBLICATIONS

Machine Translation of CN 101511652 B PDF File Name: "CN101511652B_Machine_Translation.pdf" (Year: 2011).*
Machine Translation of JP 2009261180 A PDF File Name: "JP2009261180A_Machine_Translation.pdf" (Year: 2009).*
Machine Translation of JP 2008230424 A PDF File Name: "JP2008230424A_Machine_Translation.pdf" (Year: 2008).*

\* cited by examiner

VEHICLE STOP HOLDING DEVICE

CROSS-REFERENCE TO RELATED APPLICATION

This application claims priority to Japanese Patent Application No. 2023-003879 filed on Jan. 13, 2023, incorporated herein by reference in its entirety.

BACKGROUND

1. Technical Field

The present disclosure relates to a vehicle stop holding device.

2. Description of Related Art

As a technical document relating to the vehicle stop holding device, for example, Japanese Unexamined Patent Application Publication No. 2006-306350 (JP 2006-306350 A) discloses a vehicle stop holding device that executes a backup control for automatically applying a parking brake to maintain a stop holding state of a vehicle when a power source is stopped or a driver gets off the vehicle, in a case where a braking force is held by a brake device.

SUMMARY

In the above-described vehicle stop holding device, after the backup control is started, the backup control may not be realized due to a failure of the parking brake or the like. In this case, there is a possibility that the stop holding state of the vehicle cannot be maintained.

Therefore, an object of an embodiment of the present disclosure is to provide a vehicle stop holding device capable of reliably maintaining a stop holding state of a vehicle.

A vehicle stop holding device according to an aspect of the present disclosure is a vehicle stop holding device for holding a stop state of a vehicle, and includes a control unit for starting execution of a backup control for holding the stop state of the vehicle by a brake holding device when a getting-off operation of a driver of the vehicle is detected while the vehicle is stopped by a brake device.
The control unit outputs a brake operation request requesting an operation of the brake device to the driver and releases brake of the brake device when both a releasing operation of a seat belt by the driver of the vehicle and an opening operation that is an operation for opening a door are detected during a period from start of the execution of the backup control until completion of the backup control.

In the vehicle stop holding device according to the aspect of the present disclosure,
when determination is made that both the releasing operation and the opening operation are not detected and the backup control is not normal during the period from the start of the execution of the backup control until the completion of the backup control, the control unit may output the brake operation request and determine whether an accelerator operation or a brake operation by the driver is detected; and
when determination is made that the accelerator operation or the brake operation is detected, the control unit may release the brake of the brake device.

According to the embodiment of the present disclosure, it is possible to provide the vehicle stop holding device capable of reliably maintaining the stop holding state of the vehicle.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Hereinafter, embodiments of the present disclosure will be described in detail with reference to the drawings.

Figure 1:
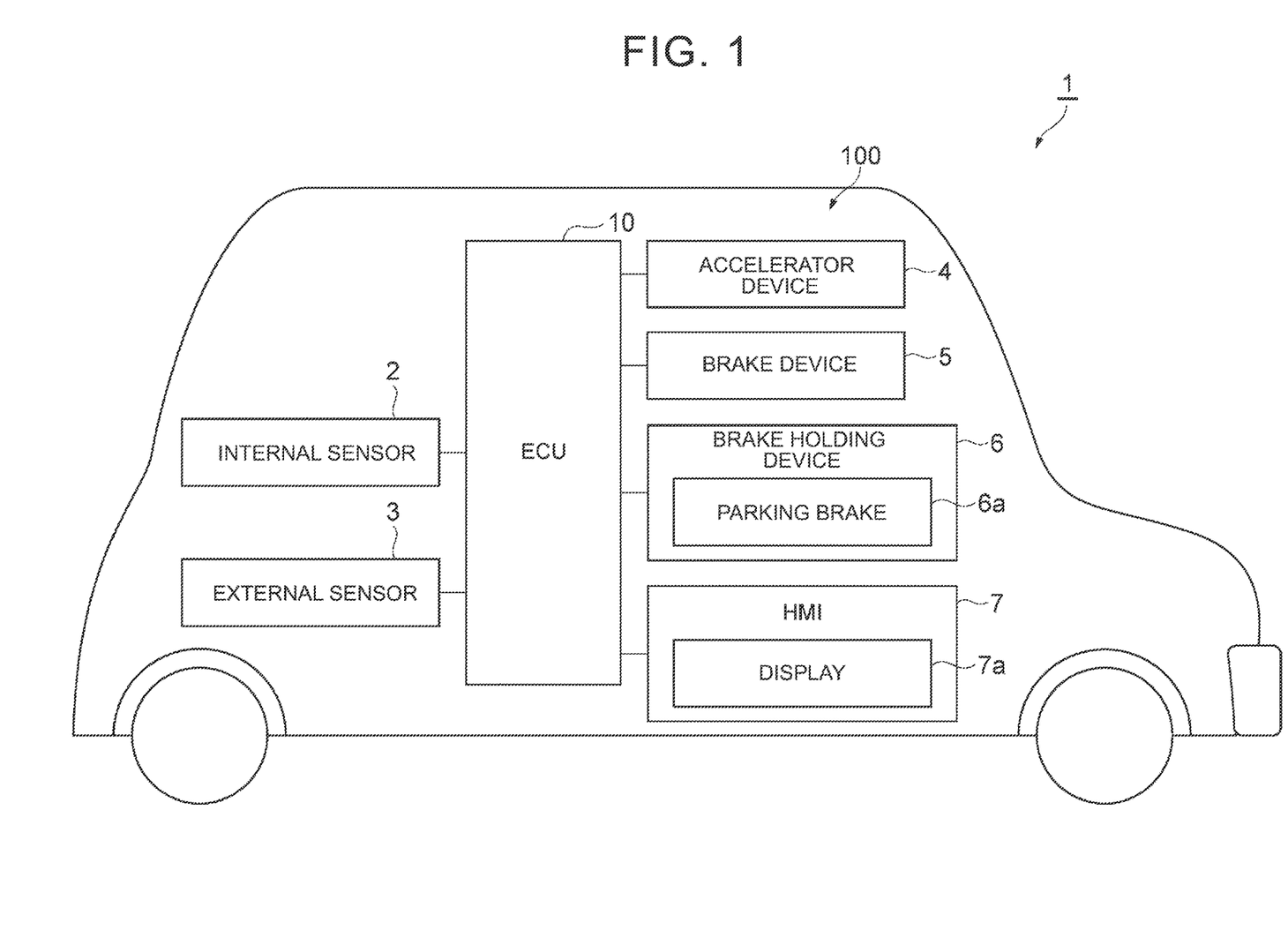
FIG. 1 is a block diagram illustrating a vehicle stop holding device according to the present embodiment.

FIG. 1 is a block diagram illustrating a vehicle stop holding device 100 according to the present embodiment. The vehicle stop holding device 100 illustrated in FIG. 1 is a device that holds the stop of the vehicle 1 when the vehicle 1 is stopped. The vehicle 1 is not particularly limited, and may be a variety of devices.

The vehicle stop holding device 100 includes an Electronic Control Unit (ECU) 10 (control unit) that comprehensively controls the system. ECU 10 is an electronic control unit with Central Processing Unit (CPU), Read Only Memory (ROM), Random Access Memory (RAM), Controller Area Network (CAN) communication circuitry, etc. In ECU 10, for example, various functions are realized by loading a program stored in a ROM into a RAM and executing the program loaded in RAM by a CPU.

ECU 10 may be composed of a plurality of electronic units. Some of the functions of ECU 10 described below may be implemented in servers capable of communicating with vehicles. The functional configuration and the process of ECU 10 will be described later. ECU 10 is connected to the internal sensor 2, the external sensor 3, the accelerator device 4, the brake device 5, the brake holding device 6, and Human Machine Interface (HMI) 7.

The internal sensor 2 is a detection device that detects a traveling state of the vehicle 1 and a state inside the vehicle 1. The internal sensor 2 transmits the detection result to ECU 10. The internal sensor 2 includes an accelerator and a brake sensor. The accelerator sensor detects an operation amount of the accelerator device 4 by the driver and transmits the detected operation amount to ECU 10. The brake sensor detects an operation amount of the brake device 5 by the driver and transmits the detected operation amount to ECU 10.

The internal sensor 2 includes a sensor that detects an operation of getting off the vehicle by the driver. The getting-off operation is an operation for an occupant who gets on the vehicle 1 to get off the vehicle 1. For example, the internal sensor 2 includes a seat belt sensor that detects a release operation of the seat belt as a getting-off operation, and a door opening/closing sensor that detects an opening operation (hereinafter, referred to as a "door opening operation") that is an operation for opening the door as a getting-off operation. The opening operation of the door may be, for example, an operation of opening a key of the door (unlocking operation). The opening operation of the door may be any other operation other than the above. The internal sensor 2 may include a vehicle speed sensor, an acceleration sensor, and a yaw rate sensor.

The external sensor 3 is a detection device for detecting an obstacle or the like around the vehicle 1. The external sensor 3 transmits the detection result to ECU 10. The external sensor 3 includes at least one of a camera, Radar, and Laser Imaging Detection and Ranging (LIDAR).

The accelerator device 4 operates a driving device such as a motor or an engine. The accelerator device 4 is controlled by drivers or ECU 10, for example. The brake device 5 controls the braking force applied to the wheels of the vehicle 1. The brake device 5 is, for example, a hydraulic brake. The brake device 5 is controlled, for example, by drivers or ECU 10.

The brake holding device 6 holds the stop state of the vehicle 1. The brake holding device 6 is controlled, for example, by drivers or ECU 10. For example, the brake holding device 6 controls the parking brake 6a in response to a control signal from ECU 10 to activate or deactivate the parking brake 6a. The parking brake 6a may be, for example, Electric Parking Brake (EPB).

HMI 7 is an interface for transmitting and inputting data between an occupant (for example, a driver) of the vehicle 1 and the vehicle stop holding device 100. HMI 7 includes a display 7a for displaying images to an occupant, a speaker for transmitting sounds to the occupant, and the like. HMI 7 displays image-information on the display 7a and transmits sound through a speaker in response to a control signal from ECU 10.

ECU 10 controls the accelerator device 4, the brake device 5, the brake holding device 6, and HMI 7 based on the detection results of the internal sensor 2 and the external sensor 3, and executes the following control.

ECU 10 assists in adjusting the vehicle speed of the vehicle 1. The vehicle speed adjustment support is a driving support that automatically adjusts the vehicle speed of the vehicle 1 in accordance with the surrounding environment of the vehicle 1 and the traveling state of the vehicle 1. The vehicle speed adjusting support is, for example, Adaptive Cruise Control (ACC) control. ACC control is, for example, control for performing constant speed control for causing the vehicle 1 to travel at a constant speed at a preset speed when there is no preceding vehicle in front of the vehicle 1. ACC control is, for example, control for performing follow-up control for adjusting the vehicle speed of the vehicle 1 so that the inter-vehicle distance to the preceding vehicle becomes a predetermined set inter-vehicle distance when the preceding vehicle is present in front of the vehicle 1. In ACC control, the vehicle 1 can be driven or stopped so as to follow the preceding vehicle in cooperation with a brake holding function, which is a function of operating the brake device 5 to apply an automated brake.

ECU 10 executes back-up control for holding the vehicle 1 in a stopped state by the brake holding device 6. Specifically, ECU 10 executes control for activating the parking brake 6a in the backup control. For example, when the vehicle 1 is a vehicle equipped with an electric parking brake (set), ECU 10 activates the electric parking brake in the backup control. Note that, for example, when the vehicle 1 is a (set) vehicle equipped with a Shift By Wire (SBW), ECU 10 activates an auto-P lock (auto-parking lock) in the backup control.

ECU 10 determines whether or not the backup control is normal. The case where the backup control is not normal (the case where there is an abnormality in the backup control) is, for example, a case where the backup control cannot be realized. The case where the backup control is not normal may be, for example, a case where the parking brake 6a fails. Further, for example, the case where the backup control is not normal may be a case where the vehicle 1 cannot be maintained in the stopped state by the brake device 5 when the vehicle 1 is stopped on the steep slope. Note that the case where the backup control is not normal may be another case other than the above.

ECU 10 executes a takeover control (brake operation handover control) for taking over (alternation) the operation of the brake device 5 to the driver. After stopping the vehicle 1 by the brake device 5, ECU 10 executes the takeover control when it is determined that the backup control is not normal prior to executing the backup control. In this takeover control, ECU 10 changes the braking force of the brake device 5 in a predetermined pattern.

When ECU 10 detects that the driver of the vehicle 1 gets off while the vehicle 1 is being stopped by the brake device 5, the brake holding device 6 starts executing the backup control for holding the stop status of the vehicle 1. When ECU 10 detects both the operation of releasing the seat belt and the operation of opening the door by the driver of the vehicle 1 during the period from the beginning to the completion of the execution of the backup control, it outputs a brake operation request requesting the driver to operate the brake device 5 and releases the brake of the brake device 5.

ECU 10 outputs a brake operation request for requesting an operation of the brake device 5 to the driver when it is determined that both the release operation of the seat belt and the opening operation of the door by the driver of the vehicle 1 are not detected and the backup control is not normal during the period from the start of the execution of the backup control until the completion of the execution of the backup control, determines whether the accelerator operation or the brake operation by the driver is detected, and releases the brake of the brake device 5 when it is determined that the accelerator operation or the brake operation is detected. Therefore, when ECU 10 detects an anomaly in the backup control, it outputs a brake operation request and continues the brake control until there is a brake operation or an accelerator operation of the driver.

Figure 2:
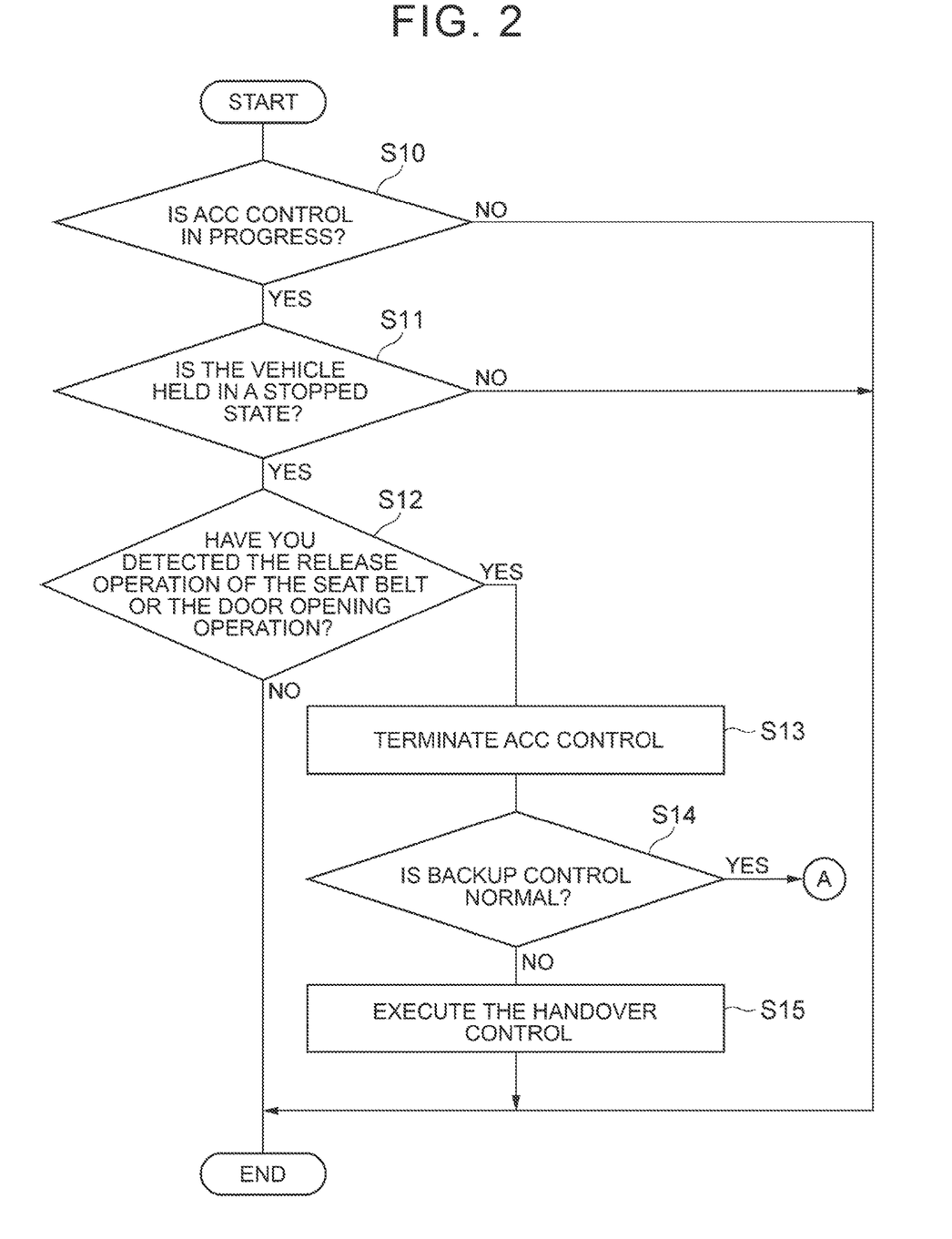
FIG. 2 is a flowchart illustrating an example of a process of holding a stop of a vehicle.
Figure 3:
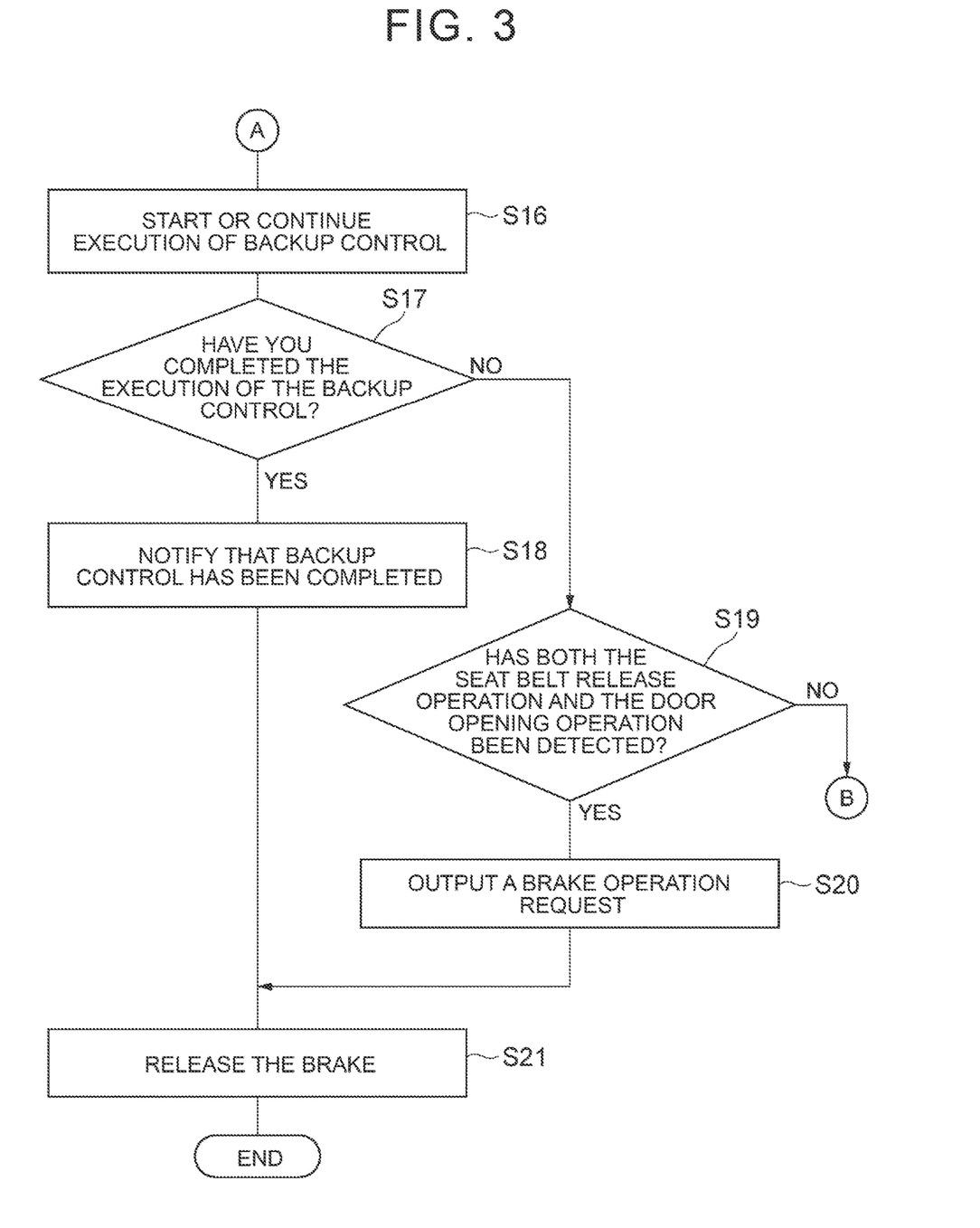
FIG. 3 is a flowchart illustrating an example of a process of holding a stop of a vehicle.
Figure 4:
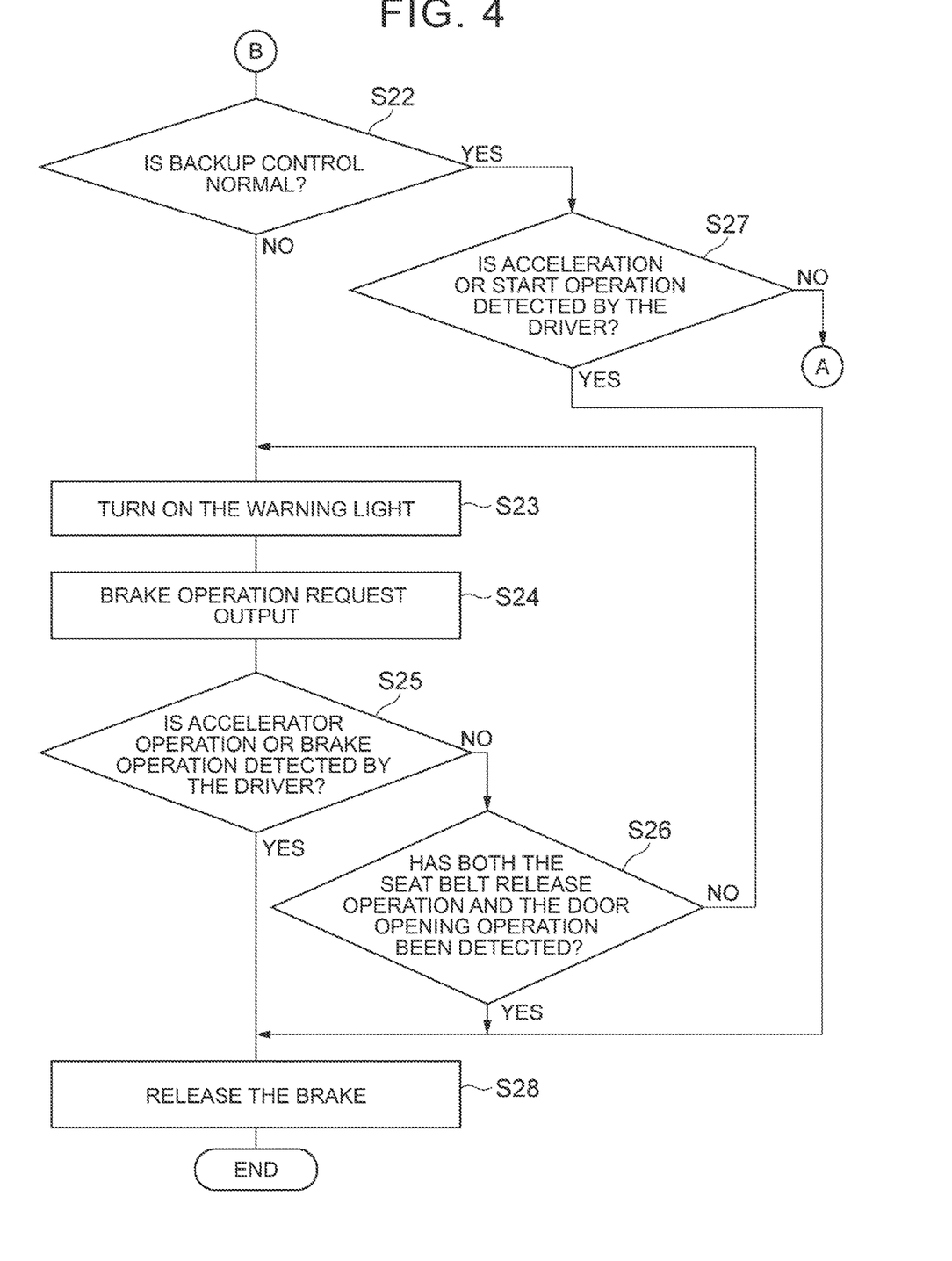
FIG. 4 is a flow chart illustrating an exemplary process for holding the stopping of vehicles.

Next, a processing method of the vehicle stop holding device 100 according to the present embodiment will be described. FIG. 2 to FIG. 4 are flowcharts illustrating an example of a process of holding a stop of the vehicle 1. ECU 10 constantly monitors whether or not the backup control is normal. For example, ECU 10 periodically executes a process of determining whether or not the backup control is normal by the brake holding device 6. More specifically, in the process of holding the stopping of the vehicles 1, the process of S28 is repeatedly executed from S10.

As illustrated in FIG. 2, in S10, ECU 10 determines whether or not ACC control is being executed. When it is determined that ACC control is being executed (S10: YES), ECU 10 proceeds to S11. When it is determined that ACC control is not being executed (S10: NO), ECU 10 proceeds to S10.

Subsequently, in S11, ECU 10 determines whether or not the vehicle 1 is held in the stop state (in the stop holding state). For example, ECU 10 acquires information indicating the vehicle speed of the vehicle 1 from the vehicle speed sensor included in the internal sensor 2, and determines whether or not the vehicle 1 is held in a stopped state. ECU 10 proceeds to S12 when it is determined that the vehicle 1 is held in the stopped condition (S11: YES). ECU 10 proceeds to S10 when it is determined that the vehicle 1 is not held in the stopped state (S11: NO).

Subsequently, in S12, ECU 10 determines whether or not the driver-operated getting-off has been detected. For example, ECU 10 determines whether an operation of releasing the seat belt or an operation of opening the door is detected by the driver. When ECU 10 determines that the driver-operated getting-off has been detected (S12: YES), the process proceeds to S13. When it is determined that ECU 10 has not detected the operation of getting off the vehicle (S12: NO), the process proceeds to S10.

Subsequently, in S13, ECU 10 terminates ACC control. Subsequently, in S14, ECU 10 determines whether or not the backup control is normal. When it is determined that the backup control is normal, ECU 10 proceeds to S16. When it is determined that the backup control is not normal (S14: NO), ECU 10 proceeds to S15. Subsequently, in S15, ECU 10 executes the takeover control. Then, the process proceeds to S10.

As illustrated in FIG. 3, in S16, ECU 10 starts executing (operating) the backup control. When the backup control has been started, in S16, ECU 10 continues the backup control. Subsequently, in S17, ECU 10 determines whether or not the back-up control has been executed. The state in which the execution of the backup control is completed is, for example, a state in which the stop of the vehicle 1 is held by the brake holding device 6. When it is determined that the backup control has been executed (S17: YES), ECU 10 proceeds to S18. In S18, ECU 10 notifies the drivers of completion of the backup control using HMI 7, and then proceeds to S21. When it is determined that the backup control has not been executed (S17: NO), ECU 10 proceeds to S19.

Subsequently, in S19, ECU 10 determines whether the driver has detected both the operation of releasing the seat belt and the operation of opening the door. If ECU 10 determines that both the seatbelt release operation and the door-opening operation have been detected (S19: YES), the process proceeds to S20. When it is determined that the release operation of the seat belt or the opening operation of the door is not detected (S19: NO), ECU 10 proceeds to S22.

Subsequently, in S20, ECU 10 outputs a braking operation-request. For example, ECU 10 outputs a brake operation request to HMI 7, and notifies the driver that the brake operation is requested by using HMI 7. Subsequently, ECU 10 moves to S10 after releasing the brake of the brake device 5 in S21.

As illustrated in FIG. 4, in S22, ECU 10 determines whether or not the backup control is normal. When it is determined that the backup control is not normal (S22: NO), ECU 10 proceeds to S23. When it is determined that the backup control is normal (S22: YES), ECU 10 proceeds to S27.

Subsequently, in S23, ECU 10 turns on the warning light. Subsequently, in S24, ECU 10 outputs braking requirements in the same manner as S20. Subsequently, in S25, ECU 10 determines whether an accelerator operation or a braking operation by the driver is detected. When it is determined that the accelerator operation or the braking operation by the driver is detected (S25: YES), ECU 10 proceeds to S28. Subsequently, in S28, ECU 10 releases the brake of the brake device 5 and then transitions to S10. When ECU 10 determines that both the accelerator operation and the braking operation by the driver have not been detected (S25: NO), the process proceeds to S26.

Subsequently, in S26, ECU 10 determines whether or not both of the seatbelt release operation and the door-opening operation have been detected. When ECU 10 does not detect the release operation of the seat belt or the opening operation of the door (S26: NO), the process proceeds to S23. ECU 10 immediately transitions to S28 when S26 detects both the release operation of the seat belt and the opening operation of the door (S26: YES). Subsequently, in S28, ECU 10 releases the brake of the brake device 5 and then transitions to S10. For example, when ECU 10 detects both the release operation and the release operation in S26, it causes the braking to be released in S28 within the period required for the driver to get off, for example, within 2 seconds. Note that, immediately after the driver performs the release operation and the release operation, the driver's attention to the driving operation is sufficiently high (driver engagement (driver coping ability) is sufficiently secured), and therefore, even if the brake of the brake device 5 is immediately released, there is no practical safety problem.

Subsequently, in S27, ECU 10 determines whether an acceleration operation or a start operation is detected by the drivers. For example, ECU 10 determines whether an acceleration operation or a start operation is detected by a driver on the basis of information acquired from the vehicle speed sensor included in the internal sensor 2. When ECU 10 determines that the acceleration operation or the start operation by the drivers has been detected (S27: YES), the process proceeds to S28. Subsequently, in S28, ECU 10 releases the brake of the brake device 5 and then transitions to S10. When ECU 10 determines that both the acceleration operation and the start operation by the drivers have not been detected (S27: NO), the process proceeds to S16. Therefore, when the backup control is not completed, ECU 10 repeatedly executes the process in S16, S17, S19, S22, S27.

As described above, according to the vehicle stop holding device 100, the device for holding the stop of the vehicle 1 includes a ECU 10 for starting the execution of the backup control for holding the stop state of the vehicle 1 by the brake holding device 6 when the driver of the vehicle 1 is detected while the vehicle 1 is stopped by the brake device 5, and ECU 10 outputs a brake operation request for requesting the driver to operate the brake device 5 and releases the brake of the brake device 5 when both the release operation of the seat belt by the driver of the vehicle 1 and the opening operation of the door are detected during the period from the start to the completion of the execution of the backup control. Accordingly, when ECU 10 detects that the driver is getting off, if the backup control can be performed, the backup control can be executed to maintain the stopped holding status of the vehicle 1. Further, when ECU 10 detects that the driver gets off, if the backup control cannot be realized, the brake operation can be released prior to the driver getting off, and the brake operation can be handed over to the driver. From the above, it is possible to reliably maintain the stop holding state of the vehicle 1.

In the related art, when ECU detects the intention of getting off the vehicle while the vehicle 1 is stopped and held, it always sounds an alarm and releases the brake of the brake device. This system of the related art makes an occupant including a driver feel anxiety, troublesomeness, and the like, and thus has become a system with a sense of discomfort for the occupant. Further, in another conventional technique, backup control is performed in which the parking brake is automatically applied to maintain the stop holding state of the vehicle when the power source is stopped or when the driver gets off when the braking force is held by the brake device. According to this conventional technique, when it is determined that the back-up control is not normal after ECU detects that the driver gets off, there is a possibility that the stopping holding status of the vehicle cannot be maintained.

On the other hand, according to the vehicle stop holding device 100, there is a case where it is determined that the backup control is not normal after the backup control is started, and in the backup control, ECU 10 issues an operation request to the brake holding device 6, and it takes 2 seconds or less to 2 seconds or more between the time when the parking brake 6a is operated and the backup control is actually completed, considering that the backup control is executed when the backup control is feasible (S14, S16 to S18), and the brake control is released before the driver gets off the vehicle when the backup (S14 to S17, S19 to S21). As a result, it is possible to reliably maintain the stop holding state of the vehicle 1, and thus it is possible to more reliably suppress the vehicle 1 in an unmanned state from moving. As a result, it is possible to realize a control that does not give anxiety, troublesomeness, or the like to an occupant including a driver (without uncomfortable feeling for the occupant), and that considers actual safety. That is, when the backup control is normal, it is possible to ensure the functional safety after the getting-off operation while completing the backup control without issuing an alarm.

According to the vehicle stop holding device 100, ECU 10 does not detect both the release operation of the seat belt and the opening operation of the door during the period from when the execution of the backup control is started to when it is completed, and when it is determined that the backup control is not normal, it outputs a brake operation request and determines whether the accelerator operation or the brake operation by the driver is detected, and when it is determined that the accelerator operation or the brake operation is detected, it releases the brake of the brake device 5. In this case, the driver can take over the braking operation to the driver at a timing at which the driver's attention to the driving operation is sufficiently high. As a result, the stop holding state of the vehicle 1 can be reliably maintained.

ECU 10 releases the brake of the brake device 5 when it is determined that the accelerator operation or the brake operation has not been detected and both the release operation and the release operation have been detected. In this case, the brake operation is taken over to the driver at a timing immediately after the driver performs the getting-off operation. As a result, the driver can take over the braking operation at a timing at which the driver's attention to the driving operation is sufficiently high. As a result, the stop holding state of the vehicle 1 can be more reliably maintained. Further, when ECU 10 detects that the driver gets off, when the backup control cannot be realized, the brake operation can be released prior to the driver getting off, and the brake operation can be handed over to the driver.

Although the embodiments have been described above, one aspect of the present disclosure is not limited to the above-described embodiments, and various modifications can be made without departing from the spirit of the disclosure.

In the above-described embodiment, ECU 10 does not detect both the release operation of the seat belt and the opening operation of the door during the period from the start to the completion of the execution of the backup control, and determines that the backup control is not normal, determines whether the accelerator operation or the braking operation by the driver is detected, and releases the brake of the brake device 5 when it is determined that the accelerator operation or the braking operation is detected, but is not limited thereto.

For example, ECU 10 may release the brake by the brake device 5 when the elapsed time from the detection of the getting-off operation by the driver is less than a predetermined time when it is determined that both the release operation of the seat belt and the opening operation of the door are not detected and the backup control is not normal during the period from the start of the execution of the backup control until the completion of the execution of the backup control. In other words, when ECU 10 determines that the backup control is not normal while the backup control is not completed, if the time point is a timing at which the driver can deal with the problem, it may immediately release the brake operation and take over the brake operation to the driver (handover). ECU 10 may release the brake by the brake device 5 when the elapsed time from the detection of the getting-off operation exceeds a predetermined time, when the accelerator operation or the brake operation is detected, or when both the release operation and the release operation are detected.

Figure 5:
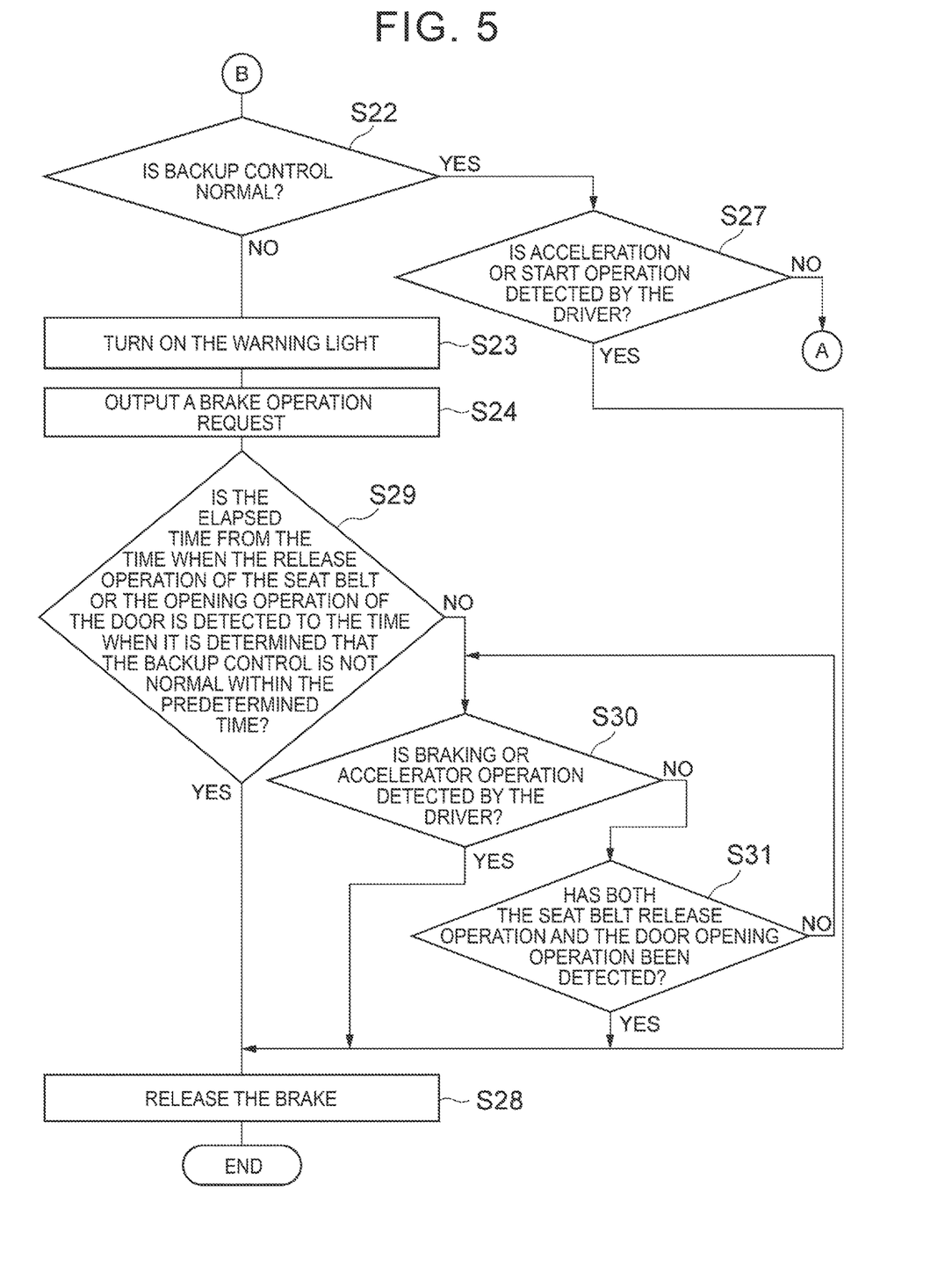
FIG. 5 is a flow chart illustrating another exemplary process of holding stoppage of vehicles.

As illustrated in FIG. 5, the process of holding the stoppage of the vehicle 1 in the modification may execute S30 process from the following S29 instead of the process of determining whether ECU 10 in S25 has detected the accelerator operation or the braking operation by the driver and the process of determining whether ECU 10 in S26 has detected both the seat belt release operation and the door opening operation.

After executing the process of outputting the braking operation request in S24, ECU 10 determines whether or not the elapsed time from the time point (S12) at which the driver detects the getting-off operation to the time point (S22) at which the backup control is determined not to be normal is within a predetermined time in S29. For example, ECU 10 determines whether or not the elapsed time from the detection of the release operation of the seat belt or the opening operation of the door is within a predetermined time.

The predetermined time is a time period in which the driver's attention to the driving operation is kept sufficiently high from the start of detection of the getting-off operation (a time period in which the driver can be dealt with sufficiently). This time is, for example, the time required for the driver to get off or leave the seat. The predetermined time is, for example, 2 seconds. Therefore, ECU 10 determines, in S29, whether or not the driver's attention to the driving manipulation is a sufficiently high timing (a timing at which the driver can be dealt with). After the predetermined time has elapsed, for example, there is a case where a child seated in the rear seat is causing some trouble with high urgency. In this case, there is a possibility that the driver performs the operation of releasing the seat belt without performing the opening operation of the door and leaves the driver's seat. Therefore, it is not preferable for ECU 10 to quickly release the brake of the brake device 5 after the predetermined period has elapsed from the viewpoint of practical safety.

ECU 10 proceeds to S28 when it is determined that the elapsed time from the detection (S12) of the getting-off manipulation by the drivers is within a predetermined time (S29: YES). When ECU 10 determines that the elapsed time from the detection (S12) of the getting-off manipulation by the drivers exceeds a predetermined time (S29: NO), the process proceeds to S30.

Subsequently, ECU 10 determines whether a braking operation or an accelerator operation is detected by the driver in S30. When it is determined that the braking operation or the accelerator operation by the driver has been detected (S30: YES), ECU 10 proceeds to S28. When ECU 10 determines that both the braking operation and the accelerator operation by the driver have not been detected (S30: NO), the process proceeds to S31.

Subsequently, ECU 10 determines, in S31, whether or not both the seatbelt release operation and the door-opening operation have been detected. If ECU 10 determines that both the seatbelt release operation and the door-opening operation have been detected (S31: YES), the process proceeds to S28. When it is determined that the release operation of the seat belt or the opening operation of the door is not detected (S31: NO), ECU 10 proceeds to S30.

In the above-described embodiment, when ECU 10 determines that the backup control is not normal between the time when the execution of the backup control is started and the time when the execution of the backup control is completed, it outputs a brake operation request and executes a process of continuing the brake control until there is a brake operation by the driver. The above processing is processing that takes into consideration the driver's attention to the driving operation. For example, in the above processing, it is assumed that a period of time has elapsed since the detection of the getting-off operation, and the driver's attention to the driving operation is reduced. In most cases, it is believed that the driver performs the braking operation immediately thereafter. However, when the driver does not perform any operation, there is a possibility that the hydraulic brake, which is the brake device 5, reaches a limit and the stop holding state of the vehicle 1 cannot be maintained.

In view of the above, as in the present modification, for example, ECU 10 may release the brake by the brake device 5 when the elapsed time from the detection of the getting-off operation by the driver is less than or equal to a predetermined time when it is determined that both the release operation of the seat belt and the opening operation of the door are not detected and the backup control is not normal during the period from the start to the completion of the execution of the backup control. In this case, the braking of the brake device 5 can be released at a timing when the driver's attention to the driving operation is sufficiently high, and the braking operation can be transferred to the driver. This makes it possible to reliably maintain the stop holding state of the vehicle 1.

ECU 10 may release the brake by the brake device 5 when the elapsed time from the detection of the getting-off operation exceeds a predetermined time, when the accelerator operation or the brake operation is detected, or when both the release operation and the release operation are detected. As a result, the driver can take over the braking operation at a timing at which the driver's attention to the driving operation is sufficiently high. As a result, the stop holding state of the vehicle 1 can be reliably maintained.

The respective configurations in the above-described embodiments and modifications are not limited to the above-described materials and shapes, and various materials and shapes can be applied. Each configuration in the above-described embodiment or modification can be arbitrarily applied to each configuration in another embodiment or modification. Part of each configuration in the above-described embodiment or modification can be appropriately omitted without departing from the gist of one aspect of the present disclosure.

What is claimed is:

1. A vehicle stop holding device for holding a stop state of a vehicle, the vehicle stop holding device comprising:

a brake holding device comprising an electronic parking brake, the brake holding device configured to activate and deactivate a parking brake of the vehicle;

a brake device configured to control braking force applied to wheels of the vehicle to stop the vehicle; and a processor configured to start execution of a backup control for holding the stop state of the vehicle, determine whether a getting-off operation of a driver of the vehicle is detected while the vehicle is stopped by the brake device, the getting-off operation including releasing a seat belt by the driver and opening a door of the vehicle by the driver, and output a brake operation request requesting an operation of the brake device to the driver and simultaneously release brake of the brake device in a case where the getting-off operation is detected during a period from start of the execution of the backup control until completion of the backup control, wherein the brake holding device is different from the brake device.

2. The vehicle stop holding device according to claim 1, wherein the processor is further configured to determine whether the backup control is in a normal condition and whether an accelerator operation or a brake operation by the driver is detected, and in a case where the processor determines that the getting-off operation is not detected and determines that the backup control is not in the normal condition during the period from the start of the execution of the backup control until the completion of the backup control, the processor is configured to output the brake operation request and determine whether the accelerator operation or the brake operation by the driver is detected; and in a case where the processor determines that the accelerator operation or the brake operation is detected, the processor is configured to release the brake of the brake device.

3. The vehicle stop holding device according to claim 2, wherein, in a case where the processor determines that the accelerator operation or the brake operation is detected, and the getting-off operation is detected, the processor is configured to release the brake of the brake device.

4. The vehicle stop holding device according to claim 1, wherein the processor is further configured to detect whether the backup control is in a normal condition, and in a case where the processor determines that the getting-off operation is not detected, the backup control is not in the normal condition during the period from the start of the execution of the backup control until the completion of the backup control, and a time elapsed from detection of the getting-off operation is within a predetermined time, the processor is configured to release the brake of the brake device.

5. The vehicle stop holding device according to claim 4, wherein the processor is further configured to determine whether the backup control is in a normal condition and whether an accelerator operation or a brake operation by the driver is detected, and in a case where the processor determines that the getting-off operation is not detected and the backup control is not in the normal condition during the period from the start of the execution of the backup control until the completion of the backup control, the accelerator operation or the brake operation by the driver is detected or the getting-off operation is detected when the elapsed time from the detection of the getting-off operation exceeds the predetermined time, the processor is configured to release the brake of the brake device.

6. The vehicle stop holding device according to claim 4, wherein the processor is further configured to determine whether an accelerator operation or a brake operation by the driver is detected, and in a case where the processor determines that the getting-off operation is not detected and the backup control is not in the normal condition during the period from the start of the execution of the backup control until the completion of the backup control, and an accelerator operation or a brake operation by the driver is detected or both a releasing operation of the seat belt by the driver of the vehicle and an opening operation that is an operation for opening the door are not detected when the elapsed time from the detection of the getting-off operation exceeds the predetermined time, the processor is configured not to release the brake of the brake device.

7. The vehicle stop holding device according to claim 1, wherein the brake device is a hydraulic brake.

8. The vehicle stop holding device according to claim 1, the vehicle stop holding device further comprising an internal sensor includes a sensor that detects the getting-off operation.

9. The vehicle stop holding device according to claim 8, wherein the internal sensor includes a seat belt sensor that detects a release operation of the seat belt as the getting-off operation, and a door opening sensor that detects an opening operation that is an operation for opening the door as the getting-off operation.

\* \* \* \* \*